(12) United States Patent
Cheng et al.

(10) Patent No.: US 8,767,666 B2
(45) Date of Patent: Jul. 1, 2014

(54) METHOD AND APPARATUS FOR WIRELESS COMMUNICATION ON MULTIPLE SPECTRUM BANDS

(71) Applicant: Samsung Electronics Co., Ltd., Gyeonggi-do (KR)

(72) Inventors: Shan Cheng, Gyeonggi-do (KR); Rakesh Taori, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/035,439

(22) Filed: Sep. 24, 2013

(65) Prior Publication Data

US 2014/0023022 A1    Jan. 23, 2014

Related U.S. Application Data

(63) Continuation of application No. 13/311,153, filed on Dec. 5, 2011, now Pat. No. 8,565,178.

(60) Provisional application No. 61/419,572, filed on Dec. 3, 2010.

(51) Int. Cl.
*H04W 4/00* (2009.01)
(52) U.S. Cl.
USPC .......................................................... 370/329
(58) Field of Classification Search
USPC .......................................... 370/329, 330, 332
See application file for complete search history.

(56) References Cited

U.S. PATENT DOCUMENTS

| | | | |
|---|---|---|---|
| 8,014,415 B2 * | 9/2011 | Alapuranen | 370/431 |
| 8,045,517 B2 | 10/2011 | So et al. | |
| 8,565,178 B2 * | 10/2013 | Cheng et al. | 370/329 |
| 2008/0225878 A1 | 9/2008 | Cordeiro et al. | |
| 2010/0272153 A1 | 10/2010 | Pinkney | |
| 2010/0279734 A1 | 11/2010 | Karkinen et al. | |
| 2010/0280751 A1 | 11/2010 | Breed | |
| 2010/0296389 A1 | 11/2010 | Khandekar et al. | |

FOREIGN PATENT DOCUMENTS

| | | |
|---|---|---|
| WO | WO 2007/031957 | 3/2007 |
| WO | WO 2008/097059 | 8/2008 |

\* cited by examiner

*Primary Examiner* — Mark Rinehart
*Assistant Examiner* — Mohammad Anwar
(74) *Attorney, Agent, or Firm* — The Farrell Law Firm, P.C.

(57) ABSTRACT

A method and apparatus for simultaneously communicating on at least two carrier frequencies, of which at least one carrier frequency is a licensed band and at least one carrier frequency is an unlicensed band, includes broadcasting an operating status of the unlicensed band to a receiver device, collecting feedback data regarding channel conditions from the receiver device for both the licensed band and unlicensed band, determining, when a bandwidth request is received from the receiver device, whether to use the unlicensed band based on the channel conditions, transmitting an unlicensed band scheduling indication to the receiver device, and communicating with the receiver device using both the licensed band and the unlicensed band according to the transmitted unlicensed band scheduling indication.

18 Claims, 5 Drawing Sheets

METHOD AND APPARATUS FOR WIRELESS COMMUNICATION ON MULTIPLE SPECTRUM BANDS

PRIORITY

This application is a Continuation Application of U.S. patent application Ser. No. 13/311,153, which was filed in the U.S. Patent and Trademark Office on Dec. 5, 2011 and claims priority under 35 U.S.C. §119(e) to U.S. Provisional Patent Application No. 61/419,572, which was filed in the U.S. Patent and Trademark Office on Dec. 3, 2010, the contents of each of which are incorporated herein by reference.

BACKGROUND OF THE INVENTION

1. Field of the Invention

The present invention relates generally to a wireless communication system, and more particularly, to a wireless communication system for transmitting and receiving data through both licensed and unlicensed bands.

2. Description of the Related Art

Spectrum bandwidth is a precious resource in wireless communication. Licensed bandwidth includes partitions of bandwidth that are licensed to operators to provide specific wireless services. Unlicensed bandwidth includes other partitions of bandwidth that are not specifically assigned to any operator, and accordingly, any entity may use these unassigned partitions as long as pre-defined requirements are met. Each operator usually provides authorized services exclusively through licensed bands (i.e., authorized services are typically provided through spectrum that may not be used by any other operators), and thus inter-operator interference may be completely avoided. However, since unlicensed bands are open and every operator or personal can access the bandwidth, interference control is very important with respect to unlicensed bands. For example, Wireless Fidelity (WiFi) technologies are deployed over unlicensed band based on a collision-detection and contention mechanism. When the number of WiFi users increases, a significant portion of resources may be wasted on contention and collision. Further, due to the contention nature of WiFi, Quality of Service (QoS) of the data service may not be guaranteed.

As stated above, licensed bands generally provide services with less interference and better QoS than services provided over unlicensed bands, which low-cost services with fair performance in exchange for less reliable or robust channel conditions due to contention and interference.

In packet-switched data networks, between layers (such as between an application layer and a top-most layer), the layers pass Service Data Units (SDU) across the interfaces. The application layer (or another higher layer) understands the structure of the data in the SDU, but the lower layer at the interface does not understand the structure. Instead, the lower layer at the interface treats the SDU as payload, operating to transport the SDU to the same interface at the destination. In order to transport the SDU, a protocol layer will add, to the SDU, certain data the protocol layer needs to perform its function. For example, the protocol layer might add a port number to identify an application, a network address to help with routing, a code to identify the type of data in the packet of the SDU and error-checking information. All this additional information, as well as the original SDU from the higher layer, constitutes a Protocol Data Unit (PDU) at this layer. When the PDU passes over an interface from a layer that constructed the PDU to a layer that merely delivers the PDU, the PDU becomes a service data unit to that layer. The process of adding addressing and control information (which is also called encapsulation) to an SDU to form a PDU and the passing of that PDU to the next lower layer as an SDU is repeated until a lowest layer is reached and the data passes over some medium as a physical signal.

SUMMARY OF THE INVENTION

The present invention is made to address at least the above problems, and/or provide the advantages described below.

An aspect of the present invention to provide apparatus and method for providing simultaneous communication from a transmitter to a receiver over both licensed and unlicensed bands.

According to an aspect of the present invention, a method, performed by a transmitter device, for simultaneously communicating on at least two carrier frequencies, of which at least one carrier frequency is a licensed band and at least one carrier frequency is an unlicensed band is provided. The method includes broadcasting an operating status of the unlicensed band to a receiver device; collecting feedback data regarding channel conditions from the receiver device for both the licensed band and unlicensed band; determining, when a bandwidth request is received from the receiver device, whether to use the unlicensed band based on the channel conditions; transmitting an unlicensed band scheduling indication to the receiver device; and communicating with the receiver device using both the licensed band and the unlicensed band according to the transmitted unlicensed band scheduling indication.

According to another aspect of the present invention, a method, performed by a receiver device, for simultaneously communicating over at least two carrier frequencies, of which at least one carrier frequency is a licensed band and at least one carrier frequency is an unlicensed band is provided. The method includes receiving an operating status of the unlicensed band from a transmitter device; transmitting feedback data regarding channel conditions to the transmitter device for both the licensed band and unlicensed band; transmitting a bandwidth request to the transmitter device; receiving an unlicensed band scheduling indication from the transmitter device; and communicating with the transmitter device using both the licensed band and the unlicensed band according to received the unlicensed band scheduling information.

According to another aspect of the present invention, a transmitter for simultaneously communicating on at least two carrier frequencies, of which at least one carrier frequency is a licensed band and at least one carrier frequency is an unlicensed band is provided. The transmitter includes a first radio frequency component for operating at the licensed band; a second radio frequency component for operating at the unlicensed band; and a controller for performing at least one of a first operation of broadcasting an operating status of the unlicensed band to a receiver and a second operation of collecting feedback data regarding channel conditions from the receiver for both the licensed band and unlicensed band, determining, when a bandwidth request is received from the receiver, whether to use the unlicensed band based on the channel conditions, transmitting an unlicensed band scheduling indication to the receiver, and communicating with the receiver using both the licensed band and the unlicensed band.

According to another aspect of the present invention, a receiver for simultaneously communicating on at least two carrier frequencies, of which at least one carrier frequency is a licensed band and at least one carrier frequency is an unlicensed band is provided. The receiver includes a first radio frequency component for operating at the licensed band; a second radio frequency component for operating at the unlicensed band; and a controller for receiving an operating status of the unlicensed band from a transmitter, transmitting feedback data regarding on channel conditions to the transmitter for both the licensed band and unlicensed band, transmitting a bandwidth request to the transmitter, receiving an unlicensed band scheduling indication from the transmitter, and communicating with the transmitter using both the licensed band and the unlicensed band.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
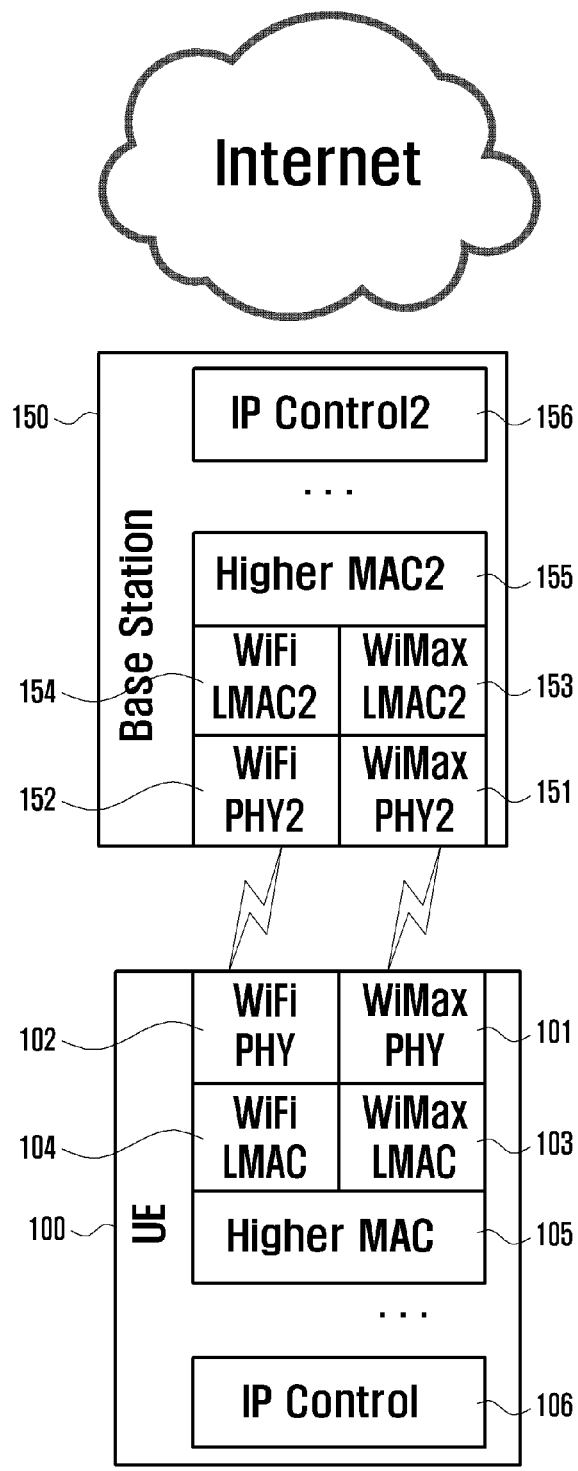
FIG. 1 is a diagram illustrating an infrastructure of a system according to an embodiment of the present invention.

Hereinafter, various embodiments of the present invention are described with reference to the accompanying drawings. In the following detailed description, same elements will be designated by same reference numerals although they are shown in different drawings. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims. Further, in the following description of the present invention, detailed descriptions of known functions and configurations incorporated herein may be omitted to avoid obscuring the subject matter of the present invention.

Hereinafter, embodiments of the present invention are described with reference to a scenario in which data transmission is performed over at least one licensed frequency band and at least one unlicensed frequency band.

FIG. 1 is a diagram illustrating an infrastructure of a system according to an embodiment of the present invention.

Referring to FIG. 1, a system according to an embodiment of the present invention may include a base station 150 and User Element (UE) 100. The base station 100 and UE 150 are each equipped with at least one licensed Radio Frequency (RF) and related PHYsical (PHY) layer module. In the present example, the licensed air interface is an Institute of Electrical and Electronics Engineers (IEEE) 802.16/Wimax system, and accordingly, the UE 100 includes WiMax PHY module 101 while base station 150 include WiMax PHY2 module 151. The base station 100 and UE 150 are also each equipped with at least one unlicensed RF and related PHY layer module. In the present example, the unlicensed air interface is IEEE 802.11/WiFi system, and accordingly, the UE 100 includes WiFi PHY module 102 while the base station 150 includes WiFi PHY2 module 152. According to other embodiments of the present invention, the IEEE 802.16/Wimax system of the present example may be replaced with any communication system working on licensed bands, and similarly, the IEEE 802.11/WiFi system of the present example may be replaced with any communication system working on unlicensed bands. Moreover, according to embodiments of the present invention, a UE and/or a base station may provide more than one licensed and/or unlicensed interface.

In the example according to FIG. 1, the transceivers (i.e., base station 150 and UE 100) may also have separated Lower Medium Access Control (LMAC) modules for each PHY module to process the data units via the MAC-PHY interface. More specifically, the UE 100 includes a WiMax LMAC module 103 and a WiFi LMAC module 104 corresponding to the WiMax PHY module 101 and the WiFi PHY module 102, respectively. Similarly, the Base Station 150 includes WiMax LMAC2 module 153 and WiFi LMAC2 module 154 corresponding to the WiMax PHY2 module 151 and the WiFi PHY2 module 152, respectively. However, in the upper MAC layers (i.e., the higher MAC layer 105 of the UE 100 and the higher MAC2 layer 155 of the base station 150), all the data units moving from the upper MAC layers to the corresponding lower MACs (i.e., LMACS 103, 104 of the UE 100 and LMAC2s 153 and 154 of the base station 150) should be portioned, while the data units moving from the lower MACs to the upper MAC layers should be merged.

Within each of the UE 100 and the base station 150, in upper layers above the lower MAC layer where the data units are portioned or merged toward/from different air interfaces, the system will have the same infrastructure as in the legacy system, (i.e., a unified module for each layer regardless the processed data units are toward/from different air interfaces). In FIG. 1, for example, these unified layers include all layers from the higher MAC layer (i.e., higher MACs 105 and 155) to the Internet Protocol (IP) layer (i.e., IP Control layer 106 and IP Control2 layer 156, respectively). The number of layers and terminology corresponding to each layer may vary from system to system. In an infrastructure of a communication system, a control plane may be attached across all layers. The control plane may provide functions for traffic control and scheduling across multiple layers. In a system according to embodiments of the present invention, new functions such as traffic control and scheduling for different air interfaces are added to the control plane.

Figure 2:
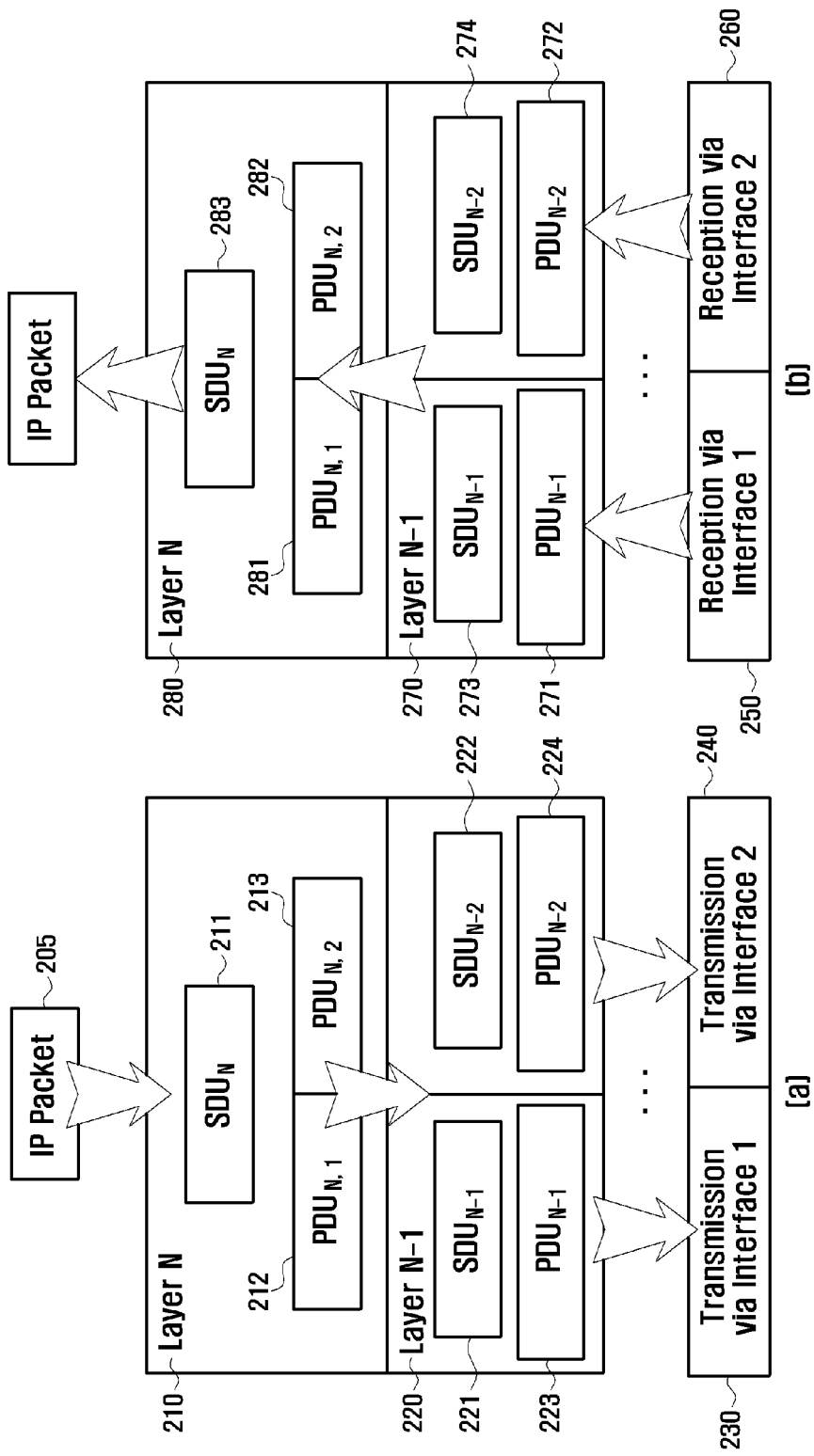
FIG. 2 is a diagram illustrating a process for Service Data Unit/Packet Data Unit (SDU/PDU) fragmentation and reassembly according to an embodiment of the present invention.

FIG. 2 is a diagram illustrating a process for Service Data Unit/Packet Data Unit (SDU/PDU) fragmentation and reassembly according to an embodiment of the present invention.

Referring to FIG. 2(a), an IP packet 205 is received from backhaul or generated at a transmitter side, which is directed to the UE. In a certain layer N 210, an $SDU_N$ 211 is portioned into at least two parts, such that each part is padded with control information and forms a PDU, such as $PDU_{N,1}$ 212 and $PDU_{N,2}$ 213. According to the present example, it is assumed that the $SDU_N$ 211 is portioned into two parts, although such a PDU may be portioned into a different number of parts according to embodiments of the present invention. The portioned PDUs (i.e., $PDU_{N,1}$ 212 and $PDU_{N,2}$ 213) are then passed down to layer N−1 220, where they are treated as SDUs 221, 222 from the upper layer and further capsuled into PDUs 223, 224 for the next lower layer until physical and transmit layer. The data contained in $PDU_{N,1}$ 212 is transmitted using a first air interface 230 (i.e., on the licensed band), while the data contained in $PDU_{N,2}$ 213 is transmitted using a second air interface 240 (i.e., on the unlicensed band).

Meanwhile, FIG. 2(b) illustrates a corresponding receiver operation. After receiving and decoding information from two separated air interfaces 250 and 260, two PDUs 271 and 272 are formed for each respective interface at layer N−1 270. The layer-respective control head is then removed from the two PDUs 271 and 272 to form two SDUs 273 and 274 for the upper layer. At layer N 280, the two SDUs 273 and 274 are received from lower layer as $PDU_{N,1}$ 281 and $PDU_{N,2}$ 282. By reading the control head of the two PDUs 281 and 282, the layer N 280 combines these PDUs into one single SDU 283 for an upper layer. The single SDU 283 is follows conventional network communication procedures, until the single SDU 283 reaches the application layer, or is routed into a backhaul.

According to an embodiment of the present invention, layer N 280 is the upper MAC layer, while layer N−1 270 is the lower MAC layer.

According to embodiments of the present invention, the layers are not restricted to the layers of the example described with reference to FIG. 2, and other such layers in accordance with embodiments of the present invention may be any layer in a hierarchical network model/infrastructure.

Figure 3:
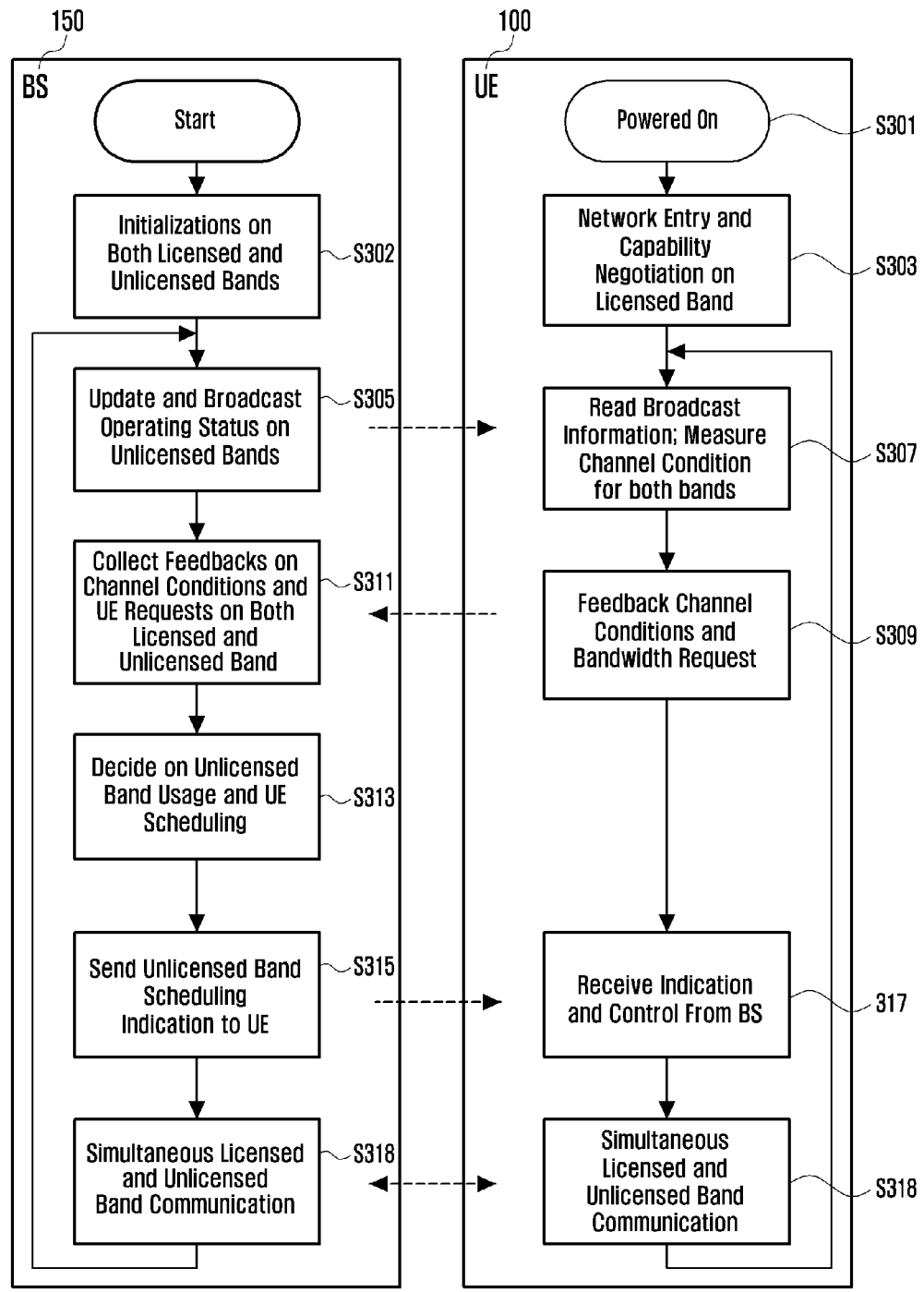
FIG. 3 is a diagram illustrating a working flow of a system according to an embodiment of the present invention.

FIG. 3 is a diagram illustrating a working flow of a system according to an embodiment of the present invention.

Referring to FIG. 3, when a dual-band UE 100 is powered up at step S301, the UE 100 may initially look for either licensed or unlicensed bands for an initial access. According to an embodiment of the present invention, the UE may initially perform network entry over the licensed band at step S303, since communication over the licensed band is generally more reliable than communication over the unlicensed band. Herein "reliable" means network service will generally be expected to be always on/available. During a capability negotiation procedure, in additional to conventional capabilities, information corresponding to a "dual licensed/unlicensed band operation" capability should be also exchanged. The capability information may further include the operating carrier frequency, supported wireless protocol, and supported bandwidth, etc. According to an embodiment of the present invention, these capability parameters are predefined so that a plurality of bits can be used to indicate all of the parameters.

At the base station side, if the base station 150 is capable of dual operation, after initialization corresponding to both the licensed and unlicensed bands in step S302, the base station 150 may broadcast its unlicensed operation capability and current operating status at step S305. The capability parameters may include the operating carrier frequency, supported wireless protocol, supported bandwidth, etc. The current operating status may include the operating carrier frequency, supported wireless protocol, supported bandwidth, etc. at which the base station 150 is currently operating. By reading the broadcast information at step S307, a capable UE 100 can send bandwidth request to the base station on for the unlicensed band communication if possible.

After the UE 100 is connected to a base station 150, the UE 100 may start to report channel status information corresponding to both licensed and unlicensed bands to the base station 150 at step S309. The UE 100 may also send a bandwidth request to the base station 150 at step S309.

The base station 150 may collect feedback on channel conditions and the bandwidth request of the UE 100 on both licensed band and unlicensed bands at step S311. Base on the channel conditions, traffic and QoS of the UE 100, as well as the traffic balance between licensed and unlicensed bands, the base station 150 will decide whether a simultaneous licensed and unlicensed communication mode should be turned on for the UE 100 at step S313.

If the UE 100 is configured to operate in the simultaneous licensed and unlicensed communication mode, the base station 150 sends, at step S315, a command to the UE 100 so that the UE 100 will turn on its function on the unlicensed band. The UE 100 receives indication and control information from the base station 150 at step S317. The UE 100 and the base station 150 will start to synchronize and monitor the unlicensed band for its control signaling and respective data traffic at step S318. According to an embodiment of the present invention, the control signals, e.g., DownLink/UpLink (DL/UL) resource allocation indications, for both licensed and unlicensed bands, may be transmitted only via the licensed band; while according to another embodiment of the present invention, the control signals for the licensed band are transmitted via the licensed band, while the control signals for unlicensed bands are transmitted via respective unlicensed bands.

During the above-described operation, the UE 100 may report channel conditions to the base station 150 periodically or aperiodically based on configuration settings. The base station 150 will adjust the dual band configuration for each UE based on the information collected. Such adjustments may include: turning off the licensed/unlicensed band operation; and change of the carrier frequency, communication protocol, and/or operating bandwidth for the unlicensed band. The base station 150 sends control signals to the UE 100 for these kinds of adjustments.

Figure 4:
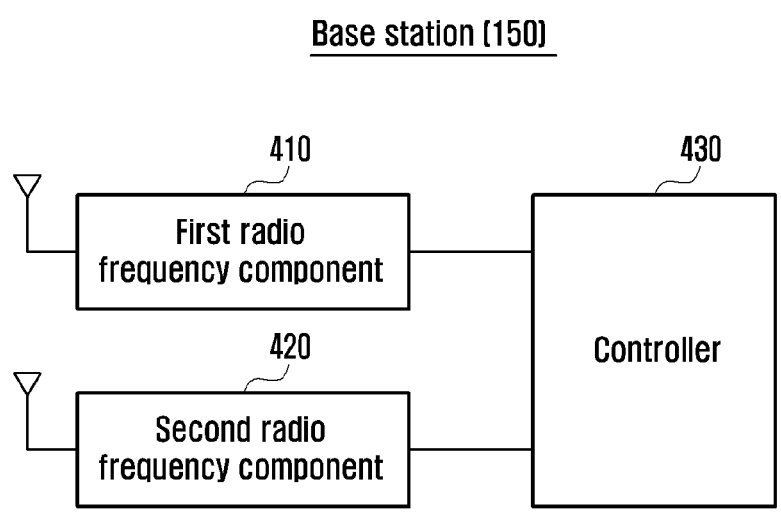
FIG. 4 is a block diagram illustrating a configuration of a base station according to an embodiment of the present invention.

FIG. 4 is a block diagram illustrating a configuration of a base station according to an embodiment of the present invention.

A base station 150 may include a first radio frequency component 410 for operating at the licensed band and a second radio frequency component 420 for operating at the unlicensed band. The base station may further include a controller 430 for broadcasting an operating status on the unlicensed bands to a receiver, collecting feedback regarding channel conditions from the receiver on both the licensed band and unlicensed band, deciding on the unlicensed band usage when receiving a bandwidth request from the receiver based on the channel condition, transmitting an unlicensed band scheduling indication to the receiver, and communicating with the receiver using both the licensed band and the unlicensed band.

The controller 430 of the base station fragments a service data unit into at least two protocol data units, transmits a first protocol data unit using the licensed band, and transmits a second protocol data unit using the unlicensed band. The service data unit fragmentation may be performed in a Medium Access Control (MAC) layer or a higher layer.

Figure 5:
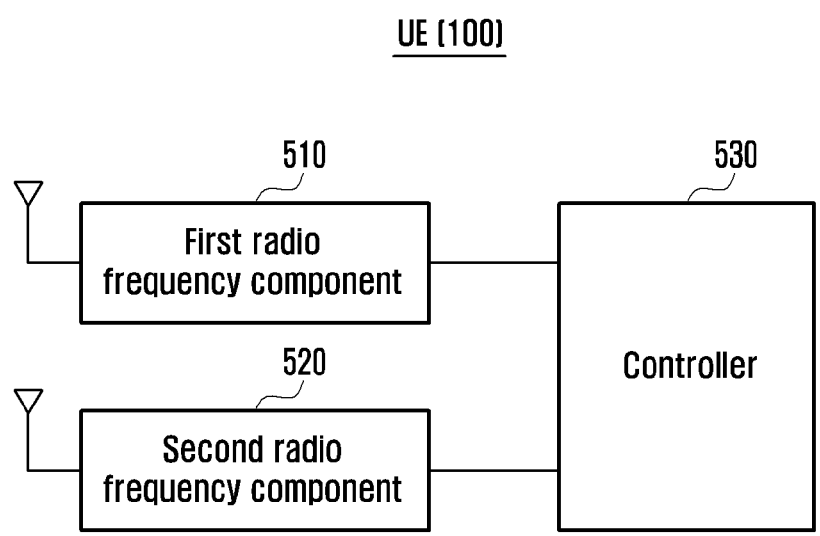
FIG. 5 is a block diagram illustrating a configuration of a base station according to an embodiment of the present invention.

FIG. 5 is a block diagram illustrating a configuration of a base station according to an embodiment of the present invention.

A UE 100 according to an embodiment of the present invention may include a first radio frequency component 510 for operating at the licensed band and a second radio frequency component 520 for operating at the unlicensed band. The UE may further include a controller 530 for receiving an operating status regarding the unlicensed bands from a transmitter, transmitting feedback regarding channel conditions to the transmitter on both the licensed band and unlicensed band, transmitting a bandwidth request to the transmitter, for receiving an unlicensed band scheduling indication from a transmitter, and communicating with the transmitter using both the licensed band and the unlicensed band.

The controller 530 of the UE receives a first protocol data unit using the licensed band, receives a second protocol data unit using the unlicensed band and combines the at least two received protocol data unit into at least one service data unit.

Although the present invention has been described above with reference to certain embodiments thereof, it will be evident that various modifications and changes may be made to these embodiments without departing from the broader spirit and scope of the present invention, as defined by the appended claims and their equivalents.

What is claimed is:

1. A first network node for serving a User Equipment (UE) with a second network node, the first network node comprising:
    a first layer for splitting a data stream delivered from an upper layer into a first data steam and a second data stream, for delivering the first data stream to a second layer of the first network node, and for delivering the second data stream to a second layer of the second network node;
    the second layer of the first network node for generating a first Packet Data Unit (PDU) using the first data stream; and
    a transmitter for transmitting the first PDU to the UE via a resource of the first network node.

2. The first network node of claim 1, wherein a number of the first layer is 1 and a number of the second layer is N−1, and the N is an integer.

3. The first network node of claim 1, wherein the first network node and the second network node are involved in dual connectivity for the UE.

4. The first network node of claim 1, wherein the second network node comprises N−1 layers.

5. The first network node of claim 4, wherein the N−1 layers of the second network node generates a second PDU using the second data stream, and
    wherein a transmitter of the second network node transmits the second PDU to the UE via a resource of the second network node.

6. A User Equipment (UE) for performing a dual connectivity with a first network node and second network node, the UE comprising:
    a first transceiver for receiving a first Packet Data Unit (PDU) on a resource of the first network node;
    a second transceiver for receiving a second PDU on a resource of the second network node;
    a second layer for the first network node for generating a first data stream using the first PDU and delivering the first data stream to a first layer for the first network node and the second network node;
    a second layer for the second network node for generating a second data stream using the second PDU and delivering the second data stream to the first layer for the first network node and the second network node; and
    the first layer for the first network node and the second network node for receiving the first data stream and the second data stream, combining the first data stream and the second data stream to generate a third data stream, and for delivering the third data stream to an upper layer of the UE.

7. The UE of claim 6, wherein a number of the second layer for the first network node is N−1, a number of the second layer for the second network node is N−1, a number of the first layer is 1, and the N is an integer.

8. The UE of claim 6, wherein the UE is involved in dual connectivity with the first network node and the second network node.

9. The UE of claim 6, wherein the first network node comprises N layers and the second network node comprises N−1 layers.

10. A method of a first network node for serving a User Equipment (UE) with a second network node, the method comprising:
    splitting, by a first layer, a data stream delivered from an upper layer into a first data steam and a second data stream;
    delivering, by the first layer, the first data stream to a second layer of the first network node;
    delivering, by the first layer, the second data stream to a second layer of the second network node;
    generating, by the second layer of the first network node, a first Packet Data Unit (PDU) using the first data stream; and
    transmitting, by a transmitter, the first PDU to the UE via a resource of the first network node.

11. The method of claim 10, wherein a number of the first layer is 1, a number of the second layer is N−1, and the N is an integer.

12. The method of claim 10, wherein the first network node and the second network node are involved in dual connectivity for the UE.

13. The method of claim 10, wherein the second network node comprises N−1 layers.

14. The method of claim 13, further comprising:
    generating, by the N−1 layers of the second network node, a second PDU using the second data stream, and
    transmitting, by a transmitter of the second network node, the second PDU to the UE via a resource of the second network node.

15. A method of User Equipment (UE) for performing a dual connectivity with a first network node and second network node, the method comprising:
    receiving, by a first transceiver for the first network node, a first Packet Data Unit (PDU) on a resource of the first network node;
    receiving, by a second transceiver for the second network node, a second PDU on a resource of the second network node;
    generating, by a second layer for the first network node, a first data stream using the first PDU and delivering the first data stream to a first layer for the first network node and the second network node;
    generating, by a second layer for the second network node, a second data stream using the second PDU and delivering the second data stream to the first layer for the first network node and the second network node; and
    receiving, by the first layer for the first network node, the first data stream and the second data stream, combining the first data stream and the second data stream to generate a data stream, and for delivering the data stream to an upper layer of the UE.

16. The method of claim 15, wherein a number of the second layer for the first network node is N−1, a number of the second layer for the second network node is N−1, a number of the first layer is 1, and the N is an integer.

17. The method of claim 15, wherein the UE is involved in dual connectivity with the first network node and the second network node.

18. The method of claim 15, wherein the first network node comprises N layers and the second network node comprises N−1 layers.

* * * * *